US008276097B2

(12) United States Patent
Chen et al.

(10) Patent No.: US 8,276,097 B2
(45) Date of Patent: Sep. 25, 2012

(54) KEY CONTROL SYSTEM AND METHOD

(75) Inventors: Jui-Chi Chen, Hsinchu (TW);
Wen-Chang Chien, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 486 days.

(21) Appl. No.: 12/654,725

(22) Filed: Dec. 30, 2009

(65) Prior Publication Data

US 2010/0211913 A1 Aug. 19, 2010

(30) Foreign Application Priority Data

Feb. 18, 2009 (TW) .............................. 98105092 A

(51) Int. Cl.
*G06F 3/048* (2006.01)
(52) U.S. Cl. ........ 715/810; 715/817; 715/819; 715/820; 715/826
(58) Field of Classification Search .................. 715/810, 715/817, 819, 820, 826
See application file for complete search history.

(56) References Cited

U.S. PATENT DOCUMENTS

| 5,781,247 | A  | * | 7/1998 | Wehmeyer et al. | ........... 348/569 |
| 5,966,124 | A  | * | 10/1999 | Devine | .......................... 715/764 |
| 6,100,886 | A  | * | 8/2000 | Lin | ................................ 715/709 |
| 2002/0007487 | A1 | * | 1/2002 | Matsumoto et al. | ............ 725/37 |
| 2002/0186621 | A1 |   | 12/2002 | Lai | |
| 2005/0041008 | A1 | * | 2/2005 | Lee | ................................ 345/102 |
| 2005/0156818 | A1 | * | 7/2005 | Tsuji | ................................ 345/26 |
| 2006/0265667 | A1 | * | 11/2006 | Hughes | ........................ 715/810 |
| 2007/0016877 | A1 | * | 1/2007 | Shirakawa et al. | ........... 715/810 |
| 2008/0068513 | A1 | * | 3/2008 | Ariyoshi et al. | ............... 348/734 |
| 2009/0024960 | A1 | * | 1/2009 | Hamamoto | .................... 715/810 |

FOREIGN PATENT DOCUMENTS

TW 316308 1/1986

OTHER PUBLICATIONS

Samsung SyncMaster 305T manual; Chinese version 29 pages and English version 30 pages; 2007 Samsung Electronics Co., Ltd.

* cited by examiner

*Primary Examiner* — Tadeese Hailu
(74) *Attorney, Agent, or Firm* — Bacon & Thomas, PLLC

(57) ABSTRACT

A key control system disposed in a display apparatus includes a hierarchical menu, a power key, and a key module. The hierarchical menu includes a first layer menu and a second layer menu. The first layer menu has an item corresponding to the second layer menu. The power key is adapted to turn on the power supply of the display apparatus. The key control system is used to execute a key control method includes steps of defining the function of the power key as opening the first layer menu of the hierarchical menu after the power supply is turned on; defining the function of the key module as selecting the item of the first layer menu when the first layer menu is opened; and defining the function of the power key as opening the second layer menu after the item of the first layer menu is selected.

20 Claims, 10 Drawing Sheets

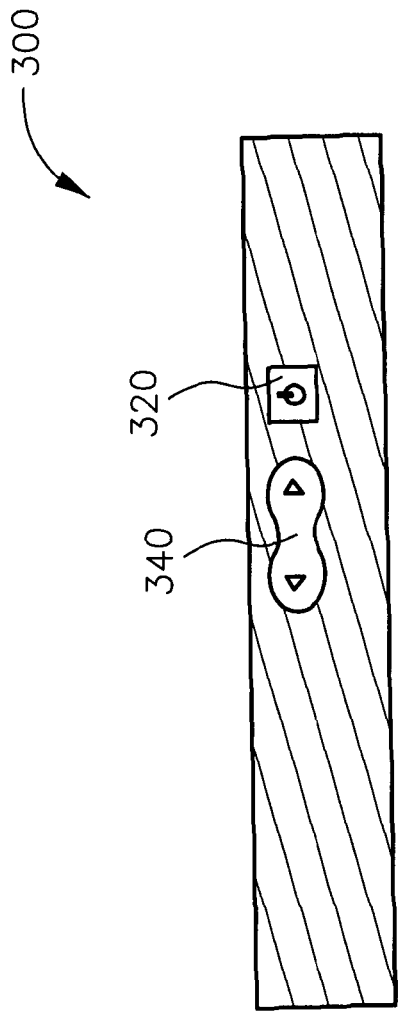
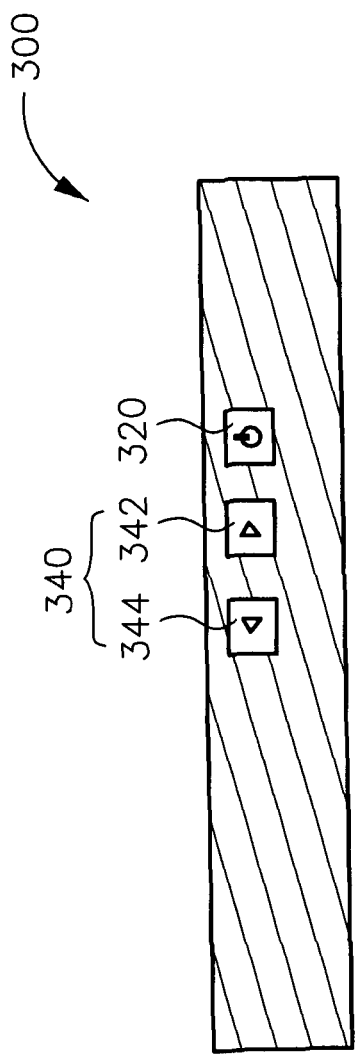
FIG. 3A
FIG. 3B

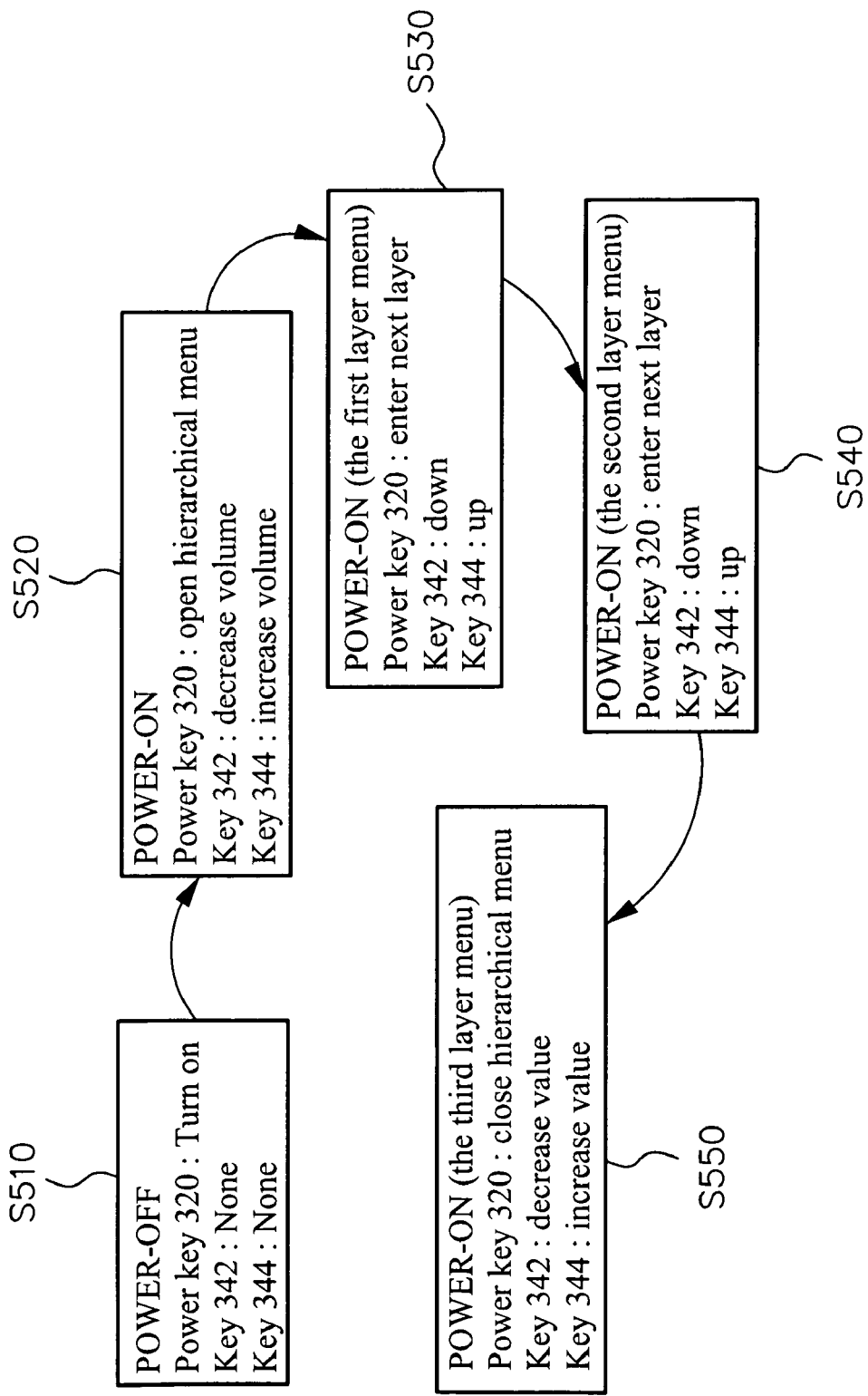
F I G. 5

__

KEY CONTROL SYSTEM AND METHOD

BACKGROUND OF THE INVENTION (1) Field of the Invention

The invention relates to a key control system and method, and especially relates to a key control system and method adapted to be used in the function of on-screen display (OSD) in a display apparatus.

(2) Description of the Related Art

Generally, screen usually has the function of on-screen display (OSD) which displays adjustment items on the screen, like brightness, contrast and color for users to adjust values of these items.

Referring to FIG. 1, a conventional on-screen display frame 100 includes a main menu 120 and a plurality of sub-menus 140. The main menu 120 includes a plurality of main items 122, and each of the main items 122 corresponds to one of the sub-menus 140, such as the sub-menu 140 corresponding to a brightness item 122 in the main menu 120 in FIG. 1. The sub-menu 140 includes a plurality of adjustment items 142. Each of the adjustment items 142 includes an icon 141 and a numerical adjusting area 143.

Referring to FIG. 2, a control keyboard 200 of the on-screen display frame 100 includes a power key 201, a menu key 202, an input key 203, an up key 204, a down key 205, a left key 206 and a right key 207. The power key 201 is capable of turning on a power supply of the screen. The menu key 202 is capable of opening the on-screen display frame 100. The up key 204 and the down key 205 are capable of moving a selecting box 102 or 104 upwards and downwards, in order to select the main item 122 of the main menu 120 or the adjustment item 142 of the sub-menu 140. When the selecting box 102 stops at the brightness item 122, users may press the input key 203 to enter the sub-menu 140 corresponding to the brightness item 122. The left key 206 and the right key 207 are used to adjust the value of the adjustment item 142 on the sub-menu 140.

However, each key on the conventional keyboard 200 only corresponds to one function, such as the power key 201 only for turning on or off the power supply of the display apparatus, thus at least seven keys are necessary to handle the on-screen display frame 100. Due to too many keys, the keyboard 200 has a large size and high cost, and thus makes the keyboard 200 unsuitable in a micro display apparatus such as handheld projector.

SUMMARY OF THE INVENTION

Accordingly, the invention is to provide a key control system and method adapted to a display apparatus with low cost.

To achieve one of, a part of or all of the above-mentioned advantages, an embodiment of the invention provides a key control system adapted to be disposed in a display apparatus. The key control system includes a hierarchical menu, a power key and a key module. The hierarchical menu includes a first layer menu and a second layer menu. The first layer menu has an item corresponding to the second layer menu. The power key is adapted to turn on a power supply of the display apparatus, and provides a first starting mechanism to open the first layer menu after the power supply is turned on. The key module provides a selecting mechanism to select the item of the first layer menu when the first layer menu is opened. The power key provides a second starting mechanism to open the second layer menu after the item of the first menu is selected.

In an embodiment, the key module provides a volume adjustment signal to adjust the volume of the display apparatus after the power supply of the display apparatus is turned on and before the first layer menu is opened.

In an embodiment, the hierarchical menu includes a third layer menu, and the third layer menu has a numerical adjusting area. The power key provides a third starting mechanism to open the third layer menu when the second layer menu is opened. The power key provides a closing mechanism to close the hierarchical menu after the third layer menu is opened, and the key module provides a numerical adjusting mechanism to adjust a value in the numerical adjusting area.

In an embodiment, the second layer menu includes an exit item to return to the first layer menu. The third layer menu includes an exit item to return to the second layer menu, the power key provides a returning mechanism to return to the first layer menu when the third layer menu is opened, and the key module provides a numerical adjusting mechanism to adjust a value in the numerical adjusting area.

In an embodiment, the power key provides an exiting mechanism to return to the second layer when the third layer menu is opened, and the key module provides a numerical adjusting mechanism to adjust a value in the numerical adjusting area.

In an embodiment, the key module includes a first key and a second key. The first key provides the selecting mechanism and the second key provides a closing mechanism to close the hierarchical menu when the first layer menu is opened. The first key of the key module provides a numerical adjusting mechanism to adjust the value in the numerical adjusting area and the second key provides an exiting mechanism to return to the second layer menu when the third layer menu is opened.

Abovementioned key control system is used to execute a key control method including steps of: defining the function of the power key as opening the first layer menu of the hierarchical menu after the power supply of the display apparatus is turned on; defining the function of the key module as selecting the item of the first layer menu when the first layer menu is opened; and defining the function of the power key as opening the second layer menu corresponding to the item of the first layer menu after the item of the first layer menu is selected.

In an embodiment, the key control method further includes steps of: defining the function of the key module as selecting the item of the second layer menu; and defining the function of the power key as opening the third layer menu corresponding to the item of the second layer menu when the second layer menu is opened.

In an embodiment, the key control method further includes a step of: defining the function of the power key as closing the hierarchical menu when the third layer menu opened.

In an embodiment, the key control method further includes steps of: defining the function of the power key as returning to the first layer menu and defining the function of the key module as adjusting a value in the numerical adjusting area when the third layer menu is opened.

In an embodiment, the key control method further includes steps of: defining the function of the power key as returning to the second layer menu and defining the function of the key module as adjusting a value in the numerical adjusting area when the third layer menu is opened.

In an embodiment, the key module includes a first key and a second key. The method further includes steps of: defining the function of the power key as starting the third layer menu of the hierarchical menu, defining the function of the first key as selecting the item of the second layer menu and defining the function of the second key as returning to the first layer menu when the second layer menu is opened. When the third layer menu is opened, the function of the first key is defined as increasing the value in the numerical adjusting area and the function of the second key is defined as returning to the second layer menu.

After the power supply of the display apparatus is turned on, the function of the power key is defined as closing the power supply of the display apparatus if the power key has been pressed for a preset time.

The embodiment or the embodiments of the invention may have at least one of the following advantages. In the embodiment, besides turning on the power supply, the power key may also open the hierarchical menu, and the keys of the key module have the functions of up and down selecting or left and right adjusting. Thus, effect of the conventional seven keys may be realized by the power key and the key module cooperating with the hierarchical menu, or the power key and two keys cooperating with the hierarchical menu. Thus, cost of the keys as well as size of the display apparatus may be reduced.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

FIG. 3A is a schematic view of the control keyboard according to an embodiment of the invention.

FIG. 3B is a schematic view of the control keyboard according to an embodiment of the invention.

FIG. 5 is a flow chart of the key control system according to an embodiment of the invention.

DESCRIPTION OF THE PREFERRED EMBODIMENTS

Figure 1:
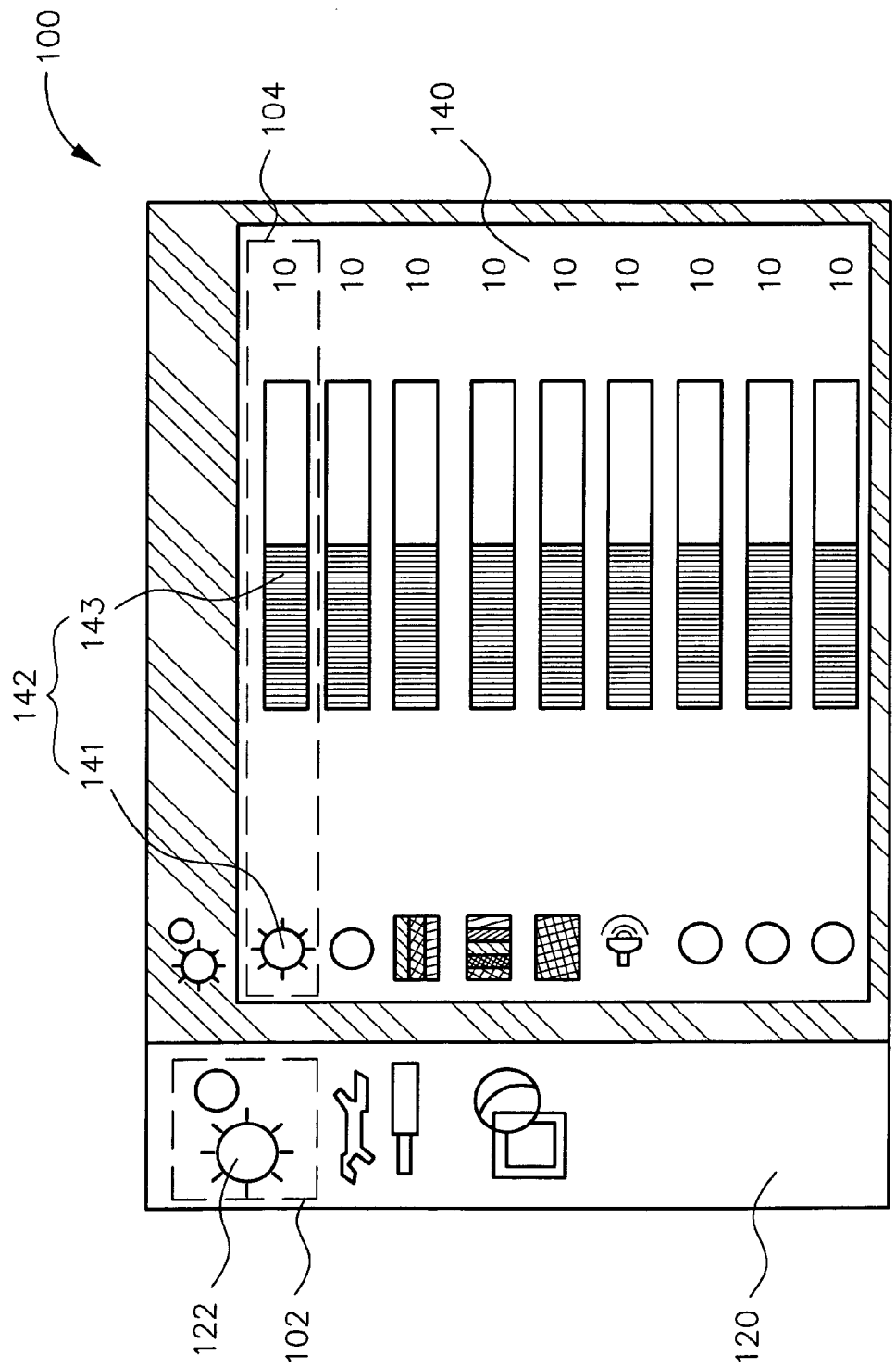
FIG. 1 is a schematic view of the menu of a conventional display apparatus.
Figure 2:
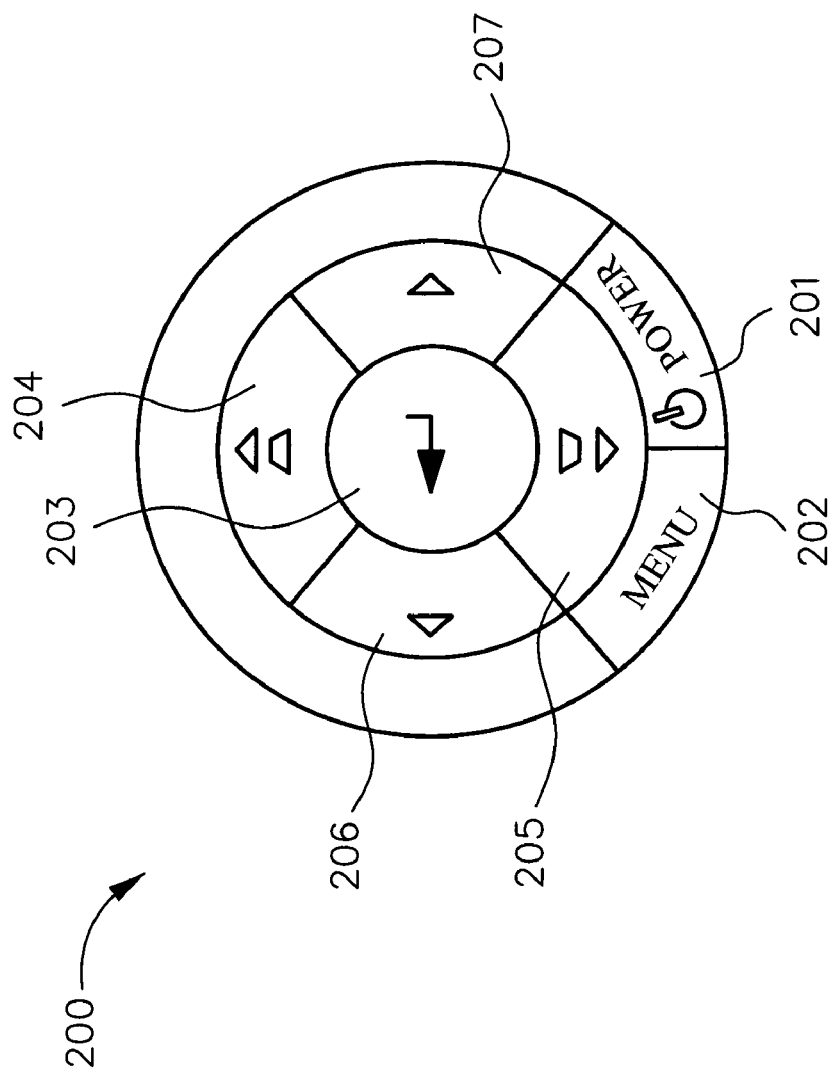
FIG. 2 is a schematic view of a conventional control keyboard.

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "including," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Referring to FIGS. 3A and 3B, a control keyboard 300 of a display apparatus (not shown) includes a power key 320 and a key module 340. The display apparatus may be a micro projector. The power key 320 is connected to a switch to selectively control a power supply of the display apparatus. The control keyboard 300 controls a menu 360 in FIG. 4A to 4C correspondingly. The key module 340 may be a single key (as shown in FIG. 3A) or constituted of two keys 342 and 344 (as shown in FIG. 3B). In the present embodiment, the menu 360 is an on-screen display frame having a hierarchical structure constituted of at least two layer menus called hierarchical menu 360.

Figure 4A:
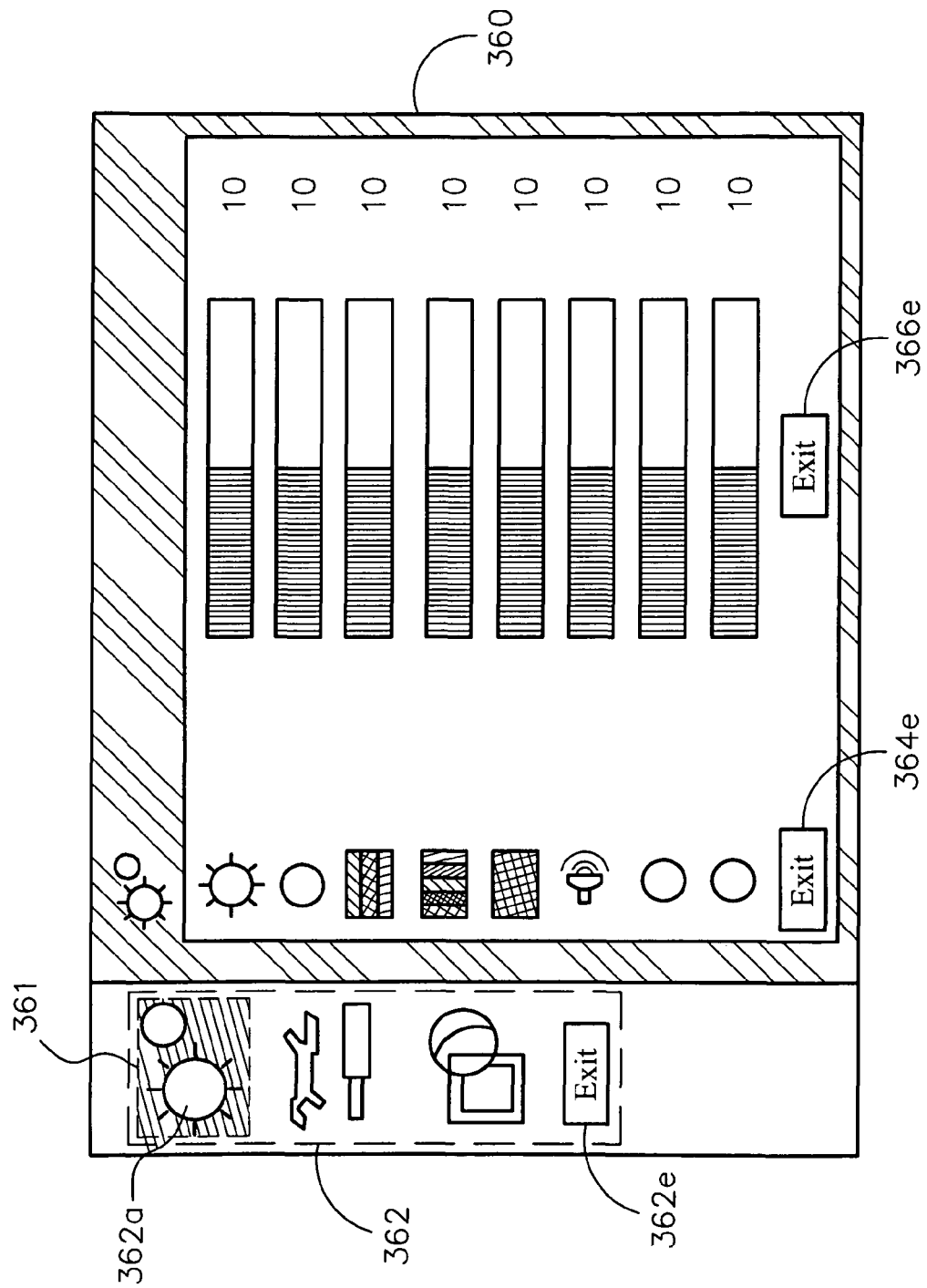
FIG. 4A to 4C are schematic views of an embodiment of the hierarchical menu according to the invention.
Figure 4B:
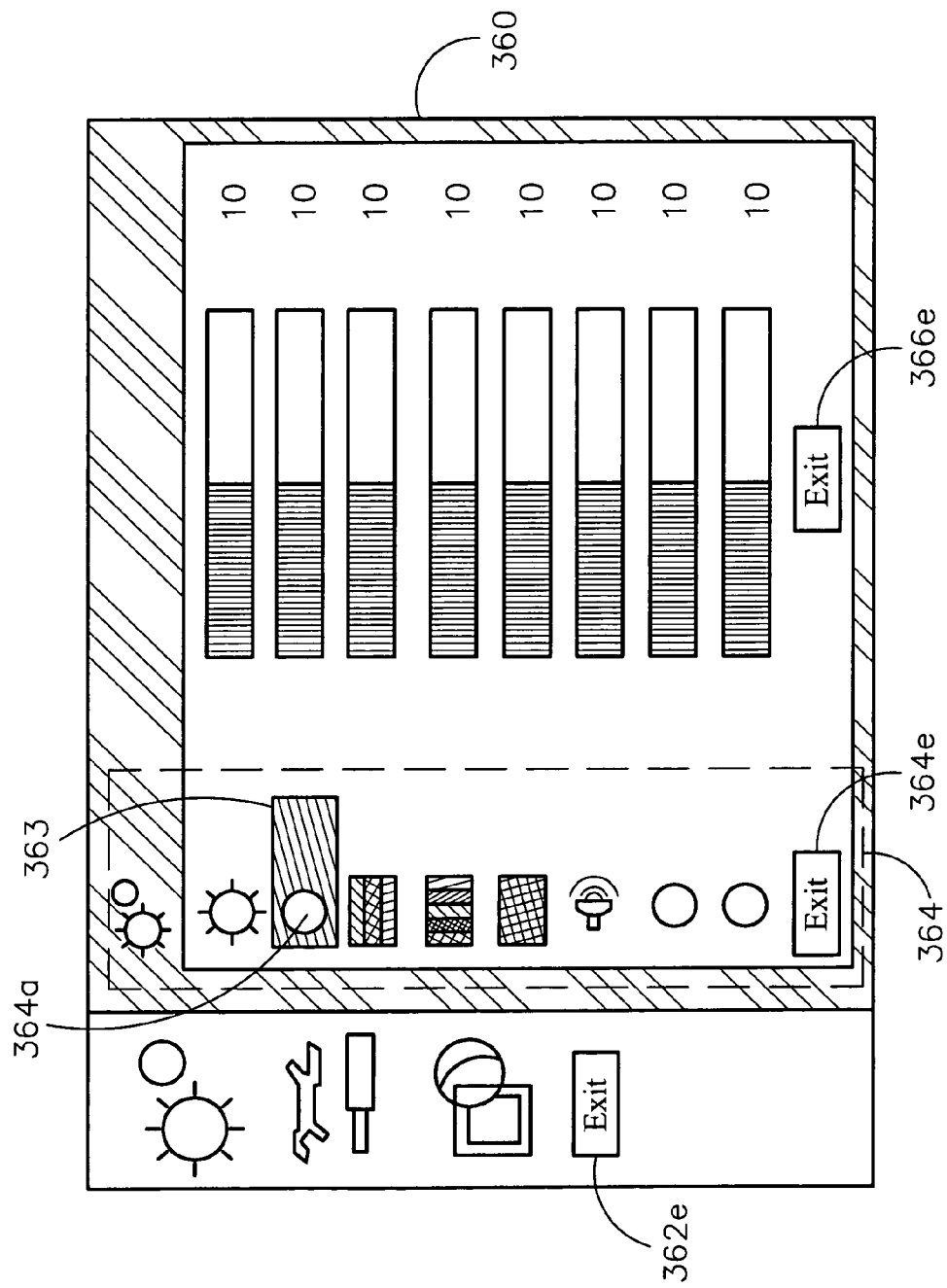
Figure 4C:
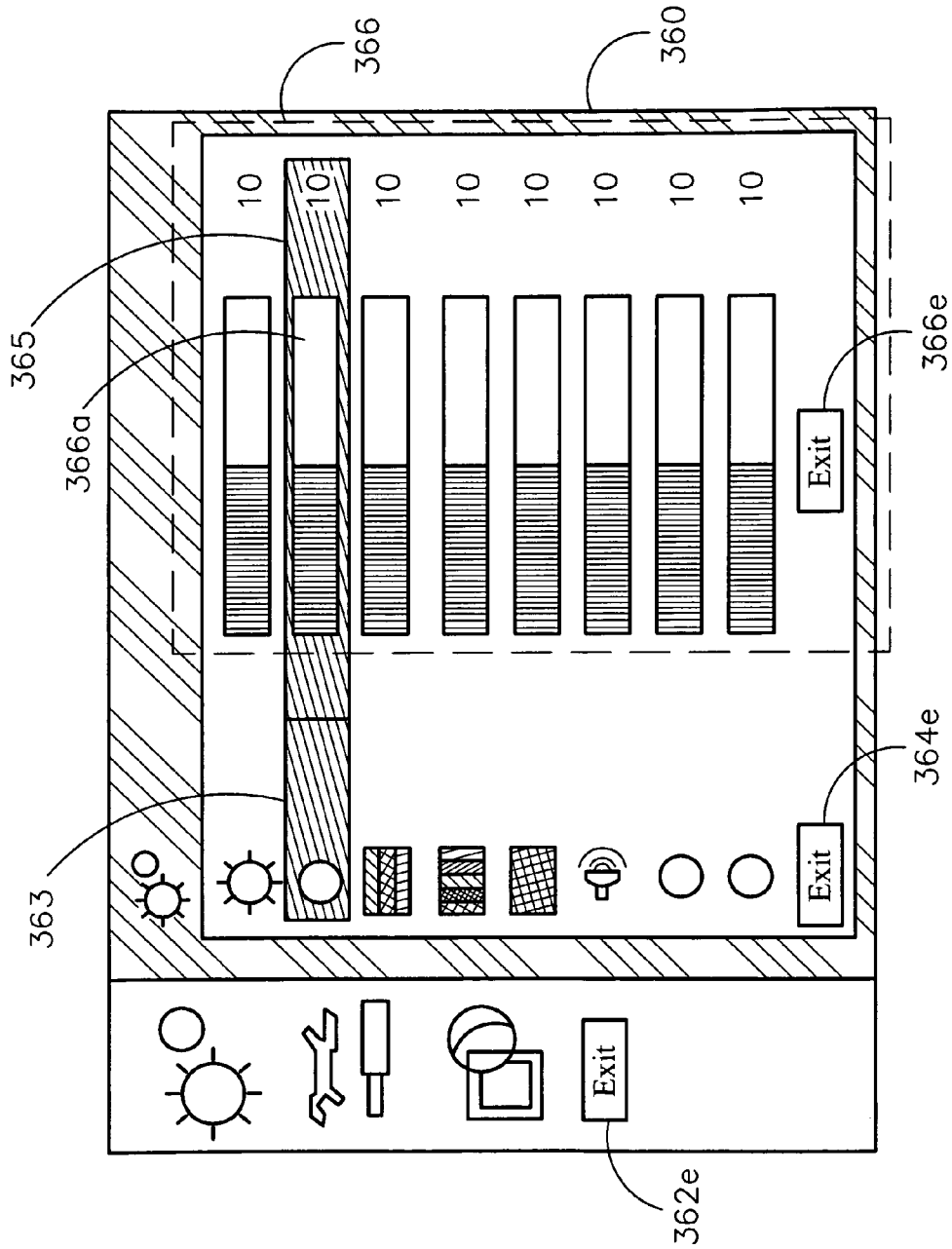

In an embodiment, the hierarchical menu 360 includes a first layer menu 362 (dotted line in FIG. 4A), a second layer menu 364 (dotted line in FIG. 4B) and a third layer menu 366 (dotted line in FIG. 4C). The first layer menu 362 has a plurality of items 362a, and each of the items 362a corresponds to one second layer menu 364. The second layer menu 364 has a plurality of items 364a and the third layer menu 366 has a plurality of adjustment areas 366a. Each of the items 364a in the second layer menu 364 corresponds to one numerical adjusting area 366a in the third layer menu 366.

Generally, the display apparatus has a control unit (not shown). When the power supply of the display apparatus is turned on, if the power key 320 is pressed to generate a first starting signal and the control unit (not shown) detects the first starting signal, the hierarchical menu 360 is opened to enter the first layer menu 362, and thus the first starting mechanism is provided by the power key 320.

After the first layer menu 362 is opened, if the key module 340 is pressed to generate a selecting signal and the control unit (not shown) detects the selecting signal, a selecting box 361 is moved to select the item 362a in the first layer menu 362, and a selecting mechanism is performed. After the item 362a is selected, the power key 320 is pressed to generate a second starting signal to open the second menu 364 corresponding to the item 362a, and the second starting mechanism is provided by the power key 320. Similarly, after the second layer menu 364 is opened, the power key 320 provides a third starting signal to open the third layer menu 366, and the third starting mechanism is provided by the power key 320.

Referring to FIG. 5, when the display apparatus is in power-off state (S510), the power key 320 in FIG. 3A or 3B is capable of turning on the power supply of the display apparatus and the key module 340 has no other function. After the power supply of the display apparatus is turned on, the display apparatus is in power-on state (S520). Before the first layer menu 360 is opened, the function of the power key 320 is defined as opening the first layer menu 362 of the hierarchical menu 360. At this time, the starting signal provided by the power key 320 is capable of opening the first layer menu 362 of the hierarchical menu 360. In the meantime, the keys 342 and 344 of the key module 340 are capable of providing volume adjusting signals to increase or decrease volume respectively.

The function of the key module 340 is defined as selecting the item 362a of the first layer menu 362 when the first layer menu 362 is opened (S530). The function of the power key 320 is defined as opening the second layer menu 364 corresponding to the item 362a after the item 362a of the first layer menu 362 is selected.

The function of the key module 340 is defined as selecting the item 364a of the second layer menu 364 when the second layer menu 364 is opened (S540). The function of the power key 320 is defined as opening the third layer menu 366 after the item 364a of the second layer menu 364 is selected.

The function of the power key 320 is defined as closing the hierarchical menu 360 when the third layer menu 366 is opened (S550). The power key 320 provides a closing signal, and the control unit (not shown) closes the hierarchical menu 360 according to the closing signal, thus the closing mechanism of the embodiment is performed. Moreover, the function of the key module 340 is defined as adjusting values. The key module 340 provides an adjusting signal, and the control unit (not shown) adjusts the value in the numerical adjusting area 366a according to the adjusting signal, and the numerical adjusting mechanism is performed.

Referring to FIG. 5 together with FIGS. 3B, 4A and 4B, when the key module 340 is constituted of two keys 342 and 344, the keys 342 and 344 are used as a down selecting key and an up selecting key respectively to move the selecting box 361 or 363 downwards and upwards in the first layer menu 362 and the second layer menu 364. In the third layer menu 366, the keys 342 and 344 are used as a left adjusting key and a right adjusting key to adjust values respectively.

Figure 6:
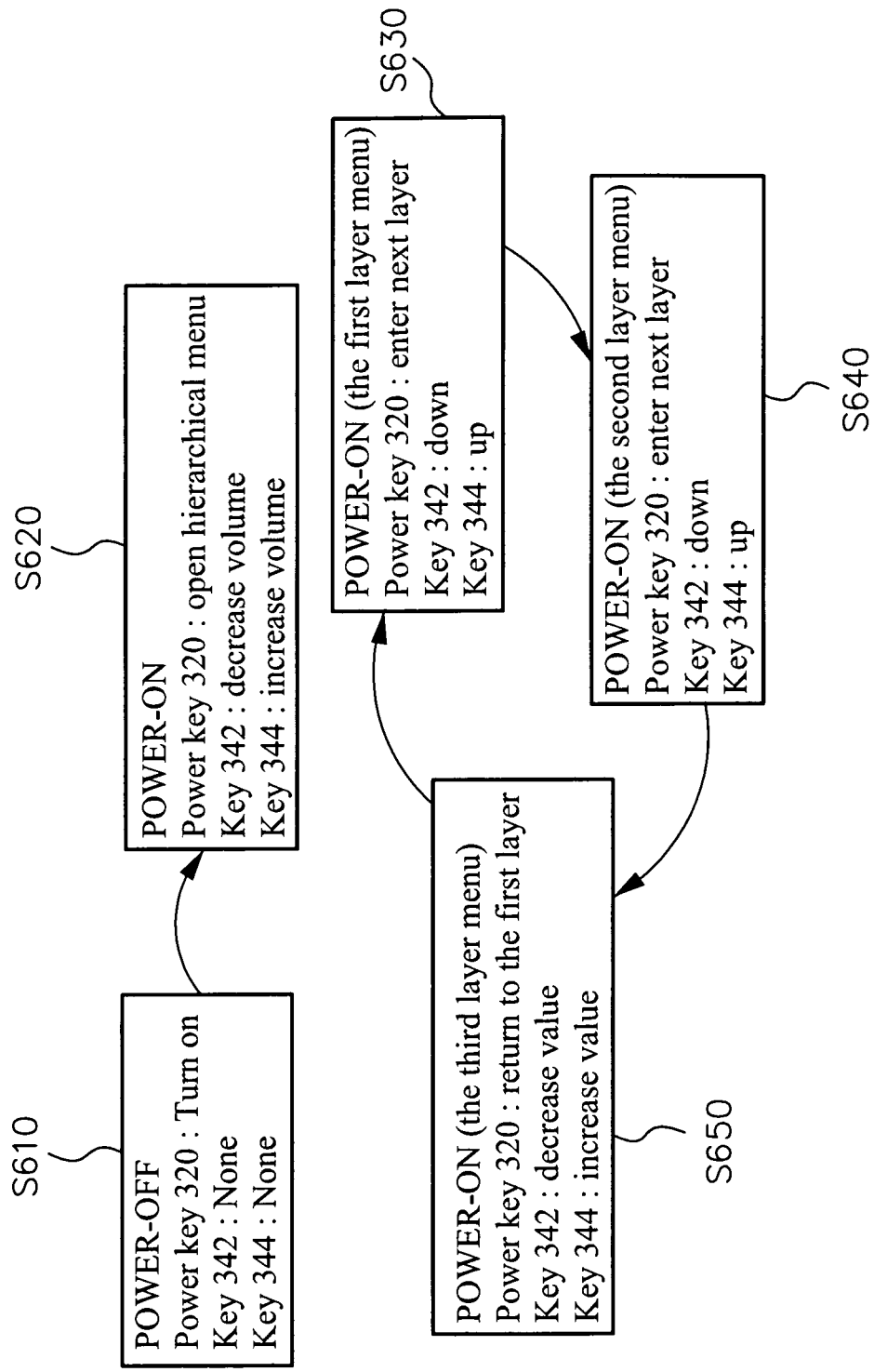
FIG. 6 is a flow chart of the key control system according to an embodiment of the invention.

Referring to FIG. 6, the power key 320 is capable of turning on the power supply when the display apparatus is in power-off state (S610). After the power supply is turned on, the display apparatus is in power-on state (S620). Before the hierarchical menu 360 is opened, the power key 320 is a menu opening key and the keys 342 and 344 are volume adjusting keys. After the first layer menu 362 is opened (S630) or when the second layer menu 364 is opened (S640), the power key 320 is a starting key of next layer menu and the keys 342 and 344 are down and up selecting keys to select the item 362a in the first layer menu 362 or the item 364a in the second layer menu 364.

Different from the embodiment in FIG. 5, the first layer menu 362 in the embodiment provides an exit item 362e to close the hierarchical menu 360, so as to return to the state when the display apparatus is turned on and the hierarchical menu 360 is closed, and thus the closing mechanism of the embodiment is performed. The second layer menu 364 provides an exit item 364e to return to the first layer menu 362; The third layer menu 366 provides an exit item 366e to return to the second layer menu 364. For the operating process in FIG. 5, the three exit items 362e, 364e and 366e are not disposed in the hierarchical menu 360.

The power key 320 is defined as returning to the first layer menu 362 for other adjustments when the third layer menu 366 or the bottom menu is opened (S650). Furthermore, the function of the key module 340 is defined as adjusting values. In other words, the power key 320 may be pressed to generate a returning signal at this time. The control unit (not shown) executes the returning signal to return to the first layer menu 362 from the third layer menu 366, and thus the returning mechanism of the embodiment is performed. The key module 340 may be pressed to provide an adjusting signal to adjust values in the numerical adjusting area 366a.

Figure 7:
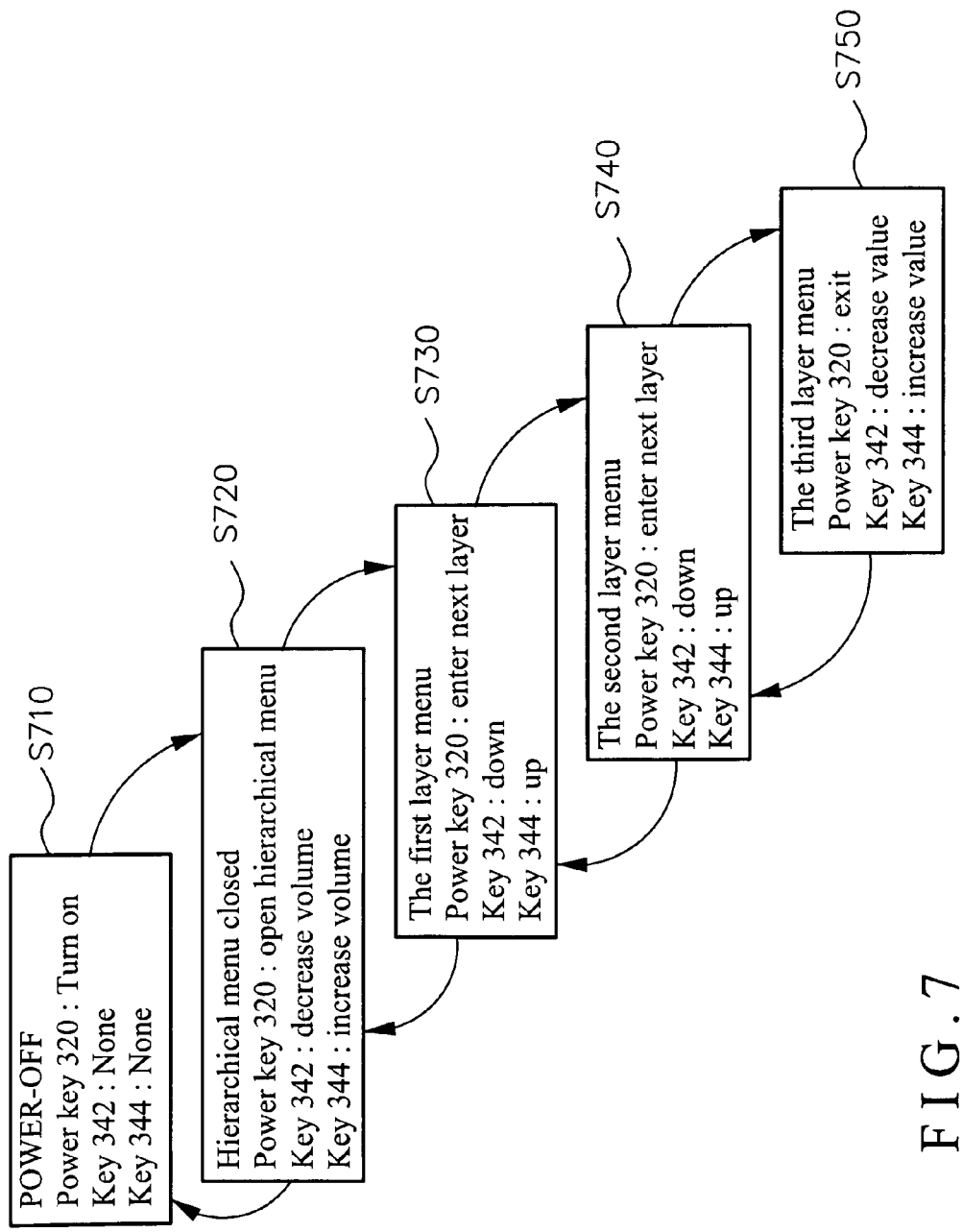
FIG. 7 is a flow chart of the key control system according to an embodiment of the invention.

Refer to FIG. 7 for a flow chart of the third embodiment of a key control system according to the invention. In the embodiment, the operating process from the power-off state of the display apparatus (S710) to opening the third layer menu (S750) is the same as FIG. 5 and FIG. 6. No extra description is provided here. Noticeably, the function of the power key 320 is defined as returning to the second layer menu 364 when the third layer menu 366 is open (S750). If the power key 320 is pressed, an exiting signal is provided to return to the second layer menu 364, and the exiting mechanism of the embodiment is performed. The function of the key module 340 is defined as adjusting value. If the key module 340 is pressed, a numerical adjusting signal is provided to adjust value of the numerical adjusting area 366a.

In such application, the first layer menu 362 provides an exit item 362e to close the hierarchical menu 360, and the closing mechanism of the embodiment is performed. The second layer menu 364 provides an exit item 364e to exit the second layer menu 364 and return to the first layer menu 362 (S740). Thus, users may easily enter next layer menu or return to up layer menu from a certain layer menu 362, 364 or 366 without closing the entire hierarchical menu 360 or returning to the first layer menu 362.

Figure 8:
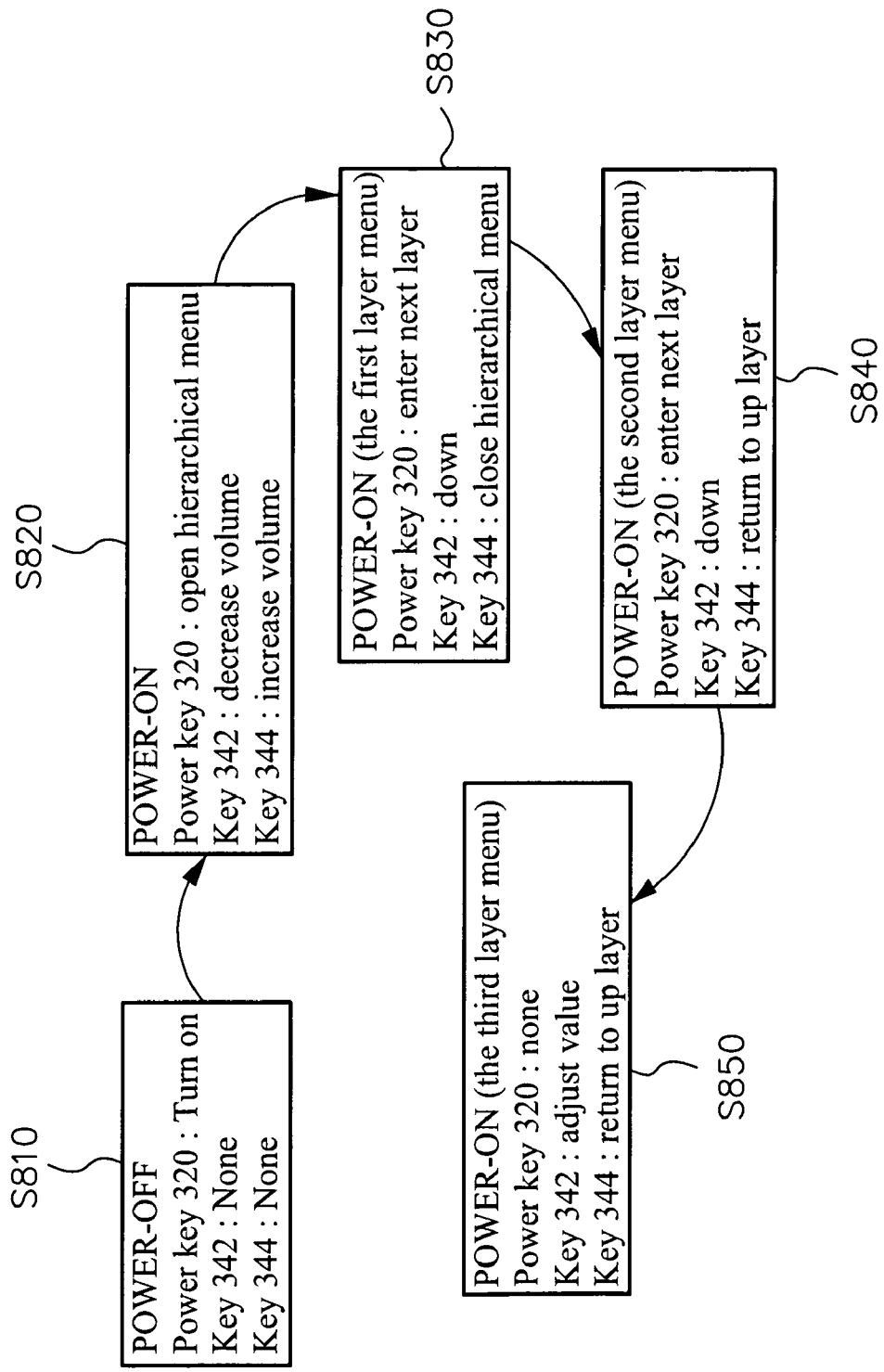
FIG. 8 is a flow chart of the key control system according to an embodiment of the invention.

Referring to FIG. 8, In the embodiment, the operating process from the power-off state of the display apparatus (S810) to opening the first layer menu (S830) is the same as FIG. 5 and FIG. 6. No extra description is provided here. Noticeably, the function of the power key 320 is defined as starting the second layer menu 364 of the hierarchical menu 360 after the first layer menu 362 is opened (S830); the function of the power key 320 is defined as moving the selecting box 361 or 363 in a single direction to select the item 362a of the first layer menu 362 or the item 364a of the second layer menu 364, in other words, the power key 320 provides a selecting signal to the control unit (not shown) for executing the selecting mechanism. The function of the key 344 is defined as returning to the up layer menu, and the exiting mechanism of the embodiment is performed.

The function of the key 342 is defined as adjusting values after the third layer menu 366 is opened (S850) to provide an adjusting signal to the control unit (not shown) to adjust the value in the numerical adjusting area 366a, and thus the numerical adjusting mechanism of the embodiment is performed. When the value in the numerical adjusting area 366a reaches a preset upper limit, if users continues pressing the key 342, the value in the numerical adjusting area 366a returns to zero and increases again. The function of the key 344 is defined as returning to the second layer menu 364. In the embodiment, the third layer menu 366 provides an exit item 366e to close the entire hierarchical menu 360, and thus the closing mechanism of the embodiment is performed.

The key control method used in the display apparatus is disclosed in above embodiments. The display apparatus has the power key 320 and the key module 340. The method includes steps of: providing the hierarchical menu 360 with a plurality of layer menus 362,364,366; defining the function of the power key 320 as opening the first layer menu 362 of the hierarchical menu 360 after the power supply of the display apparatus is turned on; defining the function of the key module 340 as selecting the item 362a of the first layer menu 362 when the first layer menu 362 opened; and defining the function of the power key 320 as opening the second layer menu 364 after the item 362a of the first layer menu 362 selected.

When the display apparatus is in power-off state, the power supply may be turned on by continuously pressing the power key 320 for a preset time, such as for more than 3 seconds. When the display apparatus is in power-on state, no matter the hierarchical menu 360 is opened or not, or when the hierarchical menu 360 is opened, no matter under any layer menu 362, 364, 366 of the hierarchical menu 360, the power supply of the display apparatus may be turned off by continuously pressing the power key 320 for a preset time, such as for more than 3 seconds.

The embodiment or the embodiments of the invention may have at least one of the following advantages. In the embodiment, besides turning on the power supply, the power key 320 may also open the hierarchical menu, and the keys 342 and 344 of the key module 340 have the functions of up and down selecting or left and right adjusting. Thus, effect of the conventional seven keys may be realized by the power key 320 and the key module 340 cooperating with the hierarchical menu 360, or the power key 320 and two keys 342, 344 cooperating with the hierarchical menu 360. In other words, at most two keys are needed in the key module, so that cost of the keys as well as size of the display apparatus may be reduced.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A key control system, adapted to be disposed in a display apparatus, the key control system comprising:

a hierarchical menu, comprising a first layer menu and a second layer menu, the first layer menu having an item corresponding to the second layer menu;

a power key, adapted to turn on a power supply of the display apparatus, and providing a first starting mechanism to open the first layer menu after the power supply is turned on; and a key module, for providing a selecting mechanism to select the item of the first layer menu when the first layer menu is opened, and the power key providing a second starting mechanism to open the second layer menu after the item is selected.

2. The key control system of claim 1, wherein the key module comprises at least one key, and the number of the at least one key is at most two.

3. The key control system of claim 1, wherein the key module provides a volume adjustment signal to adjust the volume of the display apparatus after the power supply of the display apparatus is turned on and before the first layer menu is opened.

4. The key control system of claim 1, wherein the hierarchical menu further comprises a third layer menu, and the third layer menu has a numerical adjusting area.

5. The key control system of claim 4, wherein the power key provides a third starting mechanism to open the third layer menu when the second layer menu is opened.

6. The key control system of claim 5, wherein the power key provides a closing mechanism to close the hierarchical menu when the third layer menu is opened, and the key module provides a numerical adjusting mechanism to adjust a value in the numerical adjusting area.

7. The key control system of claim 5, wherein the second layer menu comprises an exit item to return to the first layer menu.

8. The key control system of claim 7, wherein the third layer menu comprises an exit item to return to the second layer menu, the power key provides a returning mechanism to return to the first layer menu when the third layer menu is opened, and the key module provides a numerical adjusting mechanism to adjust a value in the numerical adjusting area.

9. The key control system of claim 7, wherein the power key provides an exiting mechanism to return to the second layer when the third layer menu is opened, and the key module provides a numerical adjusting mechanism to adjust a value in the numerical adjusting area.

10. The key control system of claim 1, wherein the key module comprises a first key and a second key, the first key provides the selecting mechanism, and the second key provides a closing mechanism to close the hierarchical menu when the first layer menu is opened.

11. The key control system of claim 10, wherein the hierarchical menu further comprises a third layer menu, the third layer menu has a numerical adjusting area, the power key provides a third starting mechanism to open the third layer menu when the second layer menu is opened, the first key of the key module provides a numerical adjusting mechanism to adjust a value in the numerical adjusting area, and the second key provides an exiting mechanism to return to the second layer menu when the third layer menu is opened.

12. A key control method, adapted in a display apparatus, the display apparatus comprising a power key and a key module, wherein the power key is adapted to turn on a power supply of the display apparatus, the key control method comprising steps of:

providing a hierarchical menu comprising a first layer menu and a second layer menu, the first layer menu having an item corresponding to the second layer menu;

defining the function of the power key as opening the first layer menu of the hierarchical menu after the power supply of the display apparatus is turned on;

defining the function of the key module as selecting the item of the first layer menu when the first layer menu is opened; and defining the function of the power key as opening the second layer menu after the item of the first layer menu is selected.

13. The key control method of claim 12, wherein the hierarchical menu further comprises a third layer menu, and the third layer menu has a numerical adjusting area corresponding to an item of the second layer menu.

14. The key control method of claim 13, further comprising steps of: defining the function of the key module as selecting the item of the second layer menu and defining the function of the power key as opening the third layer menu when the second layer menu is opened.

15. The key control method of claim 14, further comprising a step of: defining the function of the power key as closing the hierarchical menu when the third layer menu is opened.

16. The key control method of claim 14, further comprising steps of: defining the function of the power key as returning to the first layer menu and defining the function of the key module as adjusting a value in the numerical adjusting area when the third layer menu is opened.

17. The key control method of claim 14, further comprising steps of: defining the function of the power key as returning to the second layer menu and defining the function of the key module as adjusting a value in the numerical adjusting area when the third layer menu is opened.

18. The key control method of claim 13, wherein the key module comprises a first key and a second key, the method further comprising steps of: defining the function of the power key as starting the third layer menu of the hierarchical menu, defining the function of the first key as selecting the item of the second layer menu, and defining the function of the second key as returning to the first layer menu when the second layer menu is opened.

19. The key control method of claim 18, further comprising steps of: defining the function of the first key as increasing the value in the numerical adjusting area and defining the function of the second key as returning to the second layer menu when the third layer menu is opened.

20. The key control method of claim 12, further comprising a step of: defining the function of the power key as closing the power supply of the display apparatus if the power key has been pressed for a preset time after the power supply of the display apparatus is turned on.

* * * * *